United States Patent
Sugiura

(10) Patent No.: US 10,558,070 B2
(45) Date of Patent: Feb. 11, 2020

(54) TRANSMISSIVE-TYPE LIQUID CRYSTAL DISPLAY DEVICE AND ELECTRONIC APPARATUS

(71) Applicant: SEIKO EPSON CORPORATION, Tokyo (JP)

(72) Inventor: Yukihiro Sugiura, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/274,936

(22) Filed: Feb. 13, 2019

(65) Prior Publication Data

US 2019/0250473 A1    Aug. 15, 2019

(30) Foreign Application Priority Data

Feb. 14, 2018 (JP) ................................ 2018-024085

(51) Int. Cl.
| | |
|---|---|
| *G02F 1/1333* | (2006.01) |
| *G02F 1/1335* | (2006.01) |
| *G03B 21/00* | (2006.01) |
| *G02F 1/1362* | (2006.01) |

(52) U.S. Cl.
CPC .. *G02F 1/133345* (2013.01); *G02F 1/133524* (2013.01); *G02F 1/133526* (2013.01); *G03B 21/006* (2013.01); *G02F 1/136209* (2013.01); *G02F 1/136213* (2013.01); *G02F 1/136286* (2013.01); *G02F 2001/133565* (2013.01); *G02F 2203/01* (2013.01)

(58) Field of Classification Search
None
See application file for complete search history.

(56) References Cited

U.S. PATENT DOCUMENTS 7,087,180 B2 * 8/2006 Kaise .................. G02B 3/0012
216/24

FOREIGN PATENT DOCUMENTS

| JP | H09-230379 A | 9/1997 |
|---|---|---|
| JP | 2002-91339 A | 3/2002 |
| JP | 2003-140127 A | 5/2003 |
| JP | 2011-191475 A | 9/2011 |
| JP | 2012-226069 A | 11/2012 |
| JP | 2013-73181 A | 4/2013 |
| JP | 2016-80956 A | 5/2016 |

* cited by examiner

*Primary Examiner* — Richard H Kim
(74) *Attorney, Agent, or Firm* — Oliff PLC

(57) ABSTRACT

A transmissive-type liquid crystal display device includes a base material having transmissivity, a light-shielding body having a grid pattern in a plan view seen from a thickness direction of the base material, a pixel electrode, a first insulator that is provided to cover the light-shielding body and has transmissivity, and a second insulator that is disposed in contact with the first insulator between the base material and the pixel electrode and has transmissivity. A refractive index of the second insulator is higher than a refractive index of the first insulator. An outer edge of a surface of the second insulator on the pixel electrode side overlaps the light-shielding body in the plan view.

7 Claims, 11 Drawing Sheets

TRANSMISSIVE-TYPE LIQUID CRYSTAL DISPLAY DEVICE AND ELECTRONIC APPARATUS

BACKGROUND

1. Technical Field

The present invention relates to a transmissive-type liquid crystal display device and an electronic apparatus.

2. Related Art

A liquid crystal display device has been typically used as a light bulb in a liquid crystal projector.

For example, JP-A-2002-91339 discloses a liquid crystal display device that includes a plurality of pixel electrodes, a thin film transistor (TFT) array substrate including a TFT and wiring, a counter substrate including a counter electrode, and liquid crystals sandwiched between the TFT array substrate and the counter substrate. The TFT array substrate provided in the liquid crystal display device includes an opening region through which light passes and a boundary region surrounding the opening region in a plan view. The pixel electrodes are disposed in the opening region. The wiring and the TFT are disposed in the boundary region. An optical surface for refracting light that is deviated from the opening region and is to enter the boundary region and guiding the light to the opening region is formed on a peripheral edge of the opening region. The optical surface being provided prevents light from being incident on the TFT located in the boundary region and reduces a malfunction due to the light in the TFT.

However, since the opening region has a fixed width in the liquid crystal display device described in JP-A-2002-91339, an aperture ratio of light may decrease by an area of the boundary region in order to secure a width of the boundary region needed to dispose the wiring. For this reason, utilization efficiency of light of the liquid crystal display device may decrease.

SUMMARY

A transmissive-type liquid crystal display device according to one aspect of the invention includes a base material having transmissivity, a light-shielding body having a grid pattern in a plan view seen from a thickness direction of the base material, a pixel electrode, a first insulator that is provided to cover the light-shielding body and has transmissivity, and a second insulator that is disposed in contact with the first insulator between the base material and the pixel electrode and has transmissivity. A refractive index of the second insulator is higher than a refractive index of the first insulator. An outer edge of a surface of the second insulator on the pixel electrode side overlaps the light-shielding body in the plan view.

According to one aspect of the invention, a refractive index of the second insulator is higher than a refractive index of the first insulator, and thus light taken into the second insulator can be reflected by the interface between the second insulator and the first insulator and transmitted through the second insulator. Thus, the light taken into the second insulator can be efficiently transmitted and emitted from the second insulator. Furthermore, the outer edge of the surface of the second insulator on the pixel electrode side overlaps the light-shielding body in the plan view, and thus an aperture ratio of the light can be increased further than that in a known technology. For this reason, the utilization efficiency of light can be increased.

In one aspect of the invention, the surface of the second insulator on the pixel electrode side is preferably an incident surface allowing light to be incident on the second insulator.

According to this aspect, the amount of light that is not incident on the second insulator and is shielded by the light-shielding body can be reduced, and thus the amount of light incident on the second insulator can be increased further than that in a known technology.

In one aspect of the invention, the light-shielding body and the second insulator are preferably disposed away from each other.

According to this aspect, the light-shielding body can be set not to be exposed from the second insulator, and thus light passing through the second insulator can be prevented from being reflected diffusely by the light-shielding body.

In one aspect of the invention, an interface between the second insulator and the first insulator preferably includes an inclined portion inclined away from a central axis of the second insulator along the thickness direction of the base material from the base material side toward the pixel electrode side.

According to this aspect, in comparison with a case where the inclined portion is not provided, an aperture ratio of light can be increased while securing a width of a light-shielding region in which the light-shielding body is disposed.

In one aspect of the invention, the second insulator preferably has such a shape that a width of the second insulator continuously increases from the base material side toward the pixel electrode side.

According to this aspect, in comparison with a case where the second insulator has a fixed width, an aperture ratio of light can be increased while securing a width of the light-shielding region in which the light-shielding body is disposed.

In one aspect of the invention, preferably, a lens member is provided that overlaps the pixel electrode in the plan view, is disposed between the base material and the second insulator, has a surface on the base material side including a convex lens surface, and has transmissivity.

According to this aspect, for example, when light is incident on the second insulator from the pixel electrode side, an increase in vignetting caused by a transmission angle of the light increased by the light being refracted in the second insulator can be reduced. Further, for example, when light is incident on the second insulator from the base material side, the amount of the light incident on the second insulator can be increased further than that in a configuration without the lens member.

In one aspect of the invention, the second insulator preferably includes a first portion that has such a shape that a width of the second insulator continuously increases from the base material side toward the pixel electrode side and a second portion that is located on the base material side with respect to the first portion and has such a shape that a width of the second insulator continuously increases from the pixel electrode side toward the base material side.

According to this aspect, an increase in vignetting caused by an increase in transmission angle of light can be reduced while the amount of light incident on the second insulator can be increased.

An electronic apparatus according to one aspect of the invention preferably includes the transmissive-type liquid crystal display device according to one aspect of the present invention.

In one aspect of the invention, the transmissive-type liquid crystal display device having high utilization efficiency of light is provided, and thus the electronic apparatus of excellent quality can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, suitable exemplary embodiments according to the invention will be described with reference to accompanying drawings. Note that, dimensions and scale of each component appropriately differ from actual dimensions and scale in drawings, and some components are schematically illustrated to facilitate understanding. In addition, the scope of the invention is not limited to these embodiments unless a description of the effect that the invention is specifically limited is made in the description below.

1. Liquid Crystal Display Device

First, a transmissive-type liquid crystal display device in the invention will be described by taking, as an example, an active matrix liquid crystal display device including a thin film transistor (TFT) as a switching element. The liquid crystal display device can be suitably used as a light modulation device, namely, a light bulb of a projection-type display apparatus described later.

First Exemplary Embodiment

1(a). Basic Configuration

Figure 1:
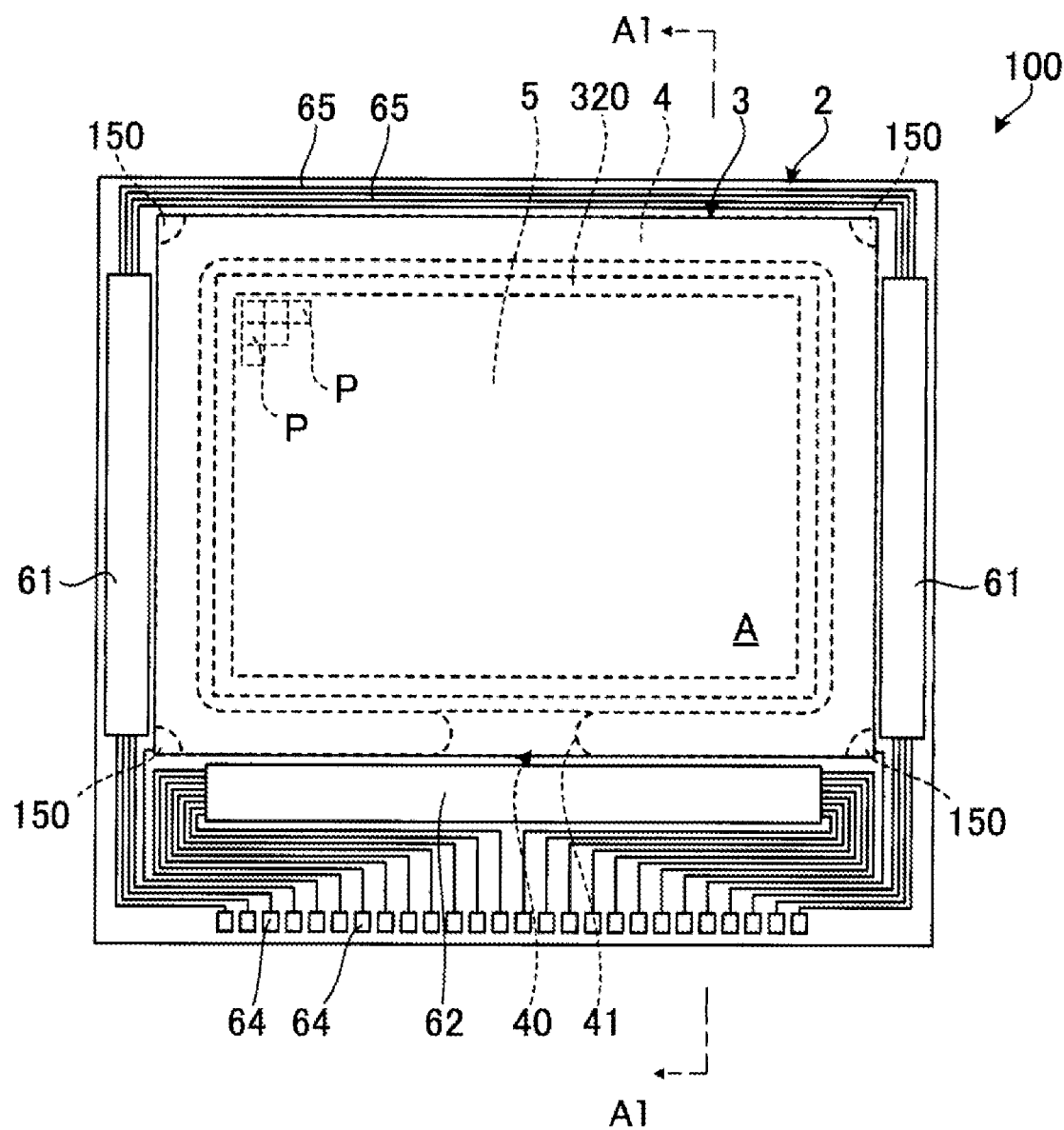
FIG. 1 illustrates a schematic plan view of a liquid crystal display device in a first exemplary embodiment.
Figure 2:
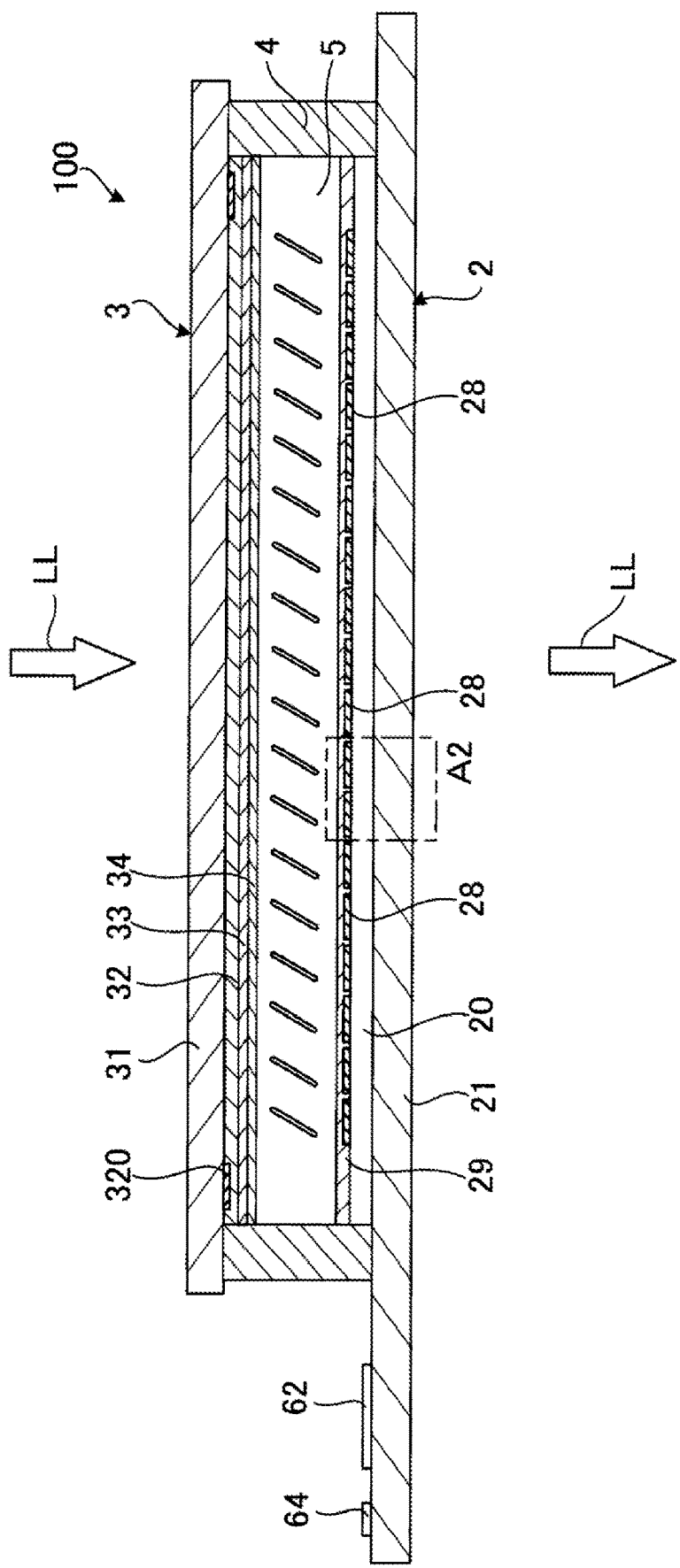
FIG. 2 is a cross-sectional view illustrating the liquid crystal display device illustrated in FIG. 1.

FIG. 1 is a schematic plan view of a liquid crystal display device in a first exemplary embodiment. FIG. 2 is a cross-sectional view of the liquid crystal display device illustrated in FIG. 1, and is a cross-sectional view taken along with a line A1-A1 in FIG. 1.

A liquid crystal display device 100 illustrated in FIGS. 1 and 2 includes an element substrate 2 (first substrate) having transmissivity, a counter substrate 3 (second substrate) that is disposed opposite to the element substrate 2 and has transmissivity, a frame-shaped sealing member 4 disposed between the element substrate 2 and the counter substrate 3, and a liquid crystal layer 5 surrounded by the element substrate 2, the counter substrate 3, and the sealing member 4. The liquid crystal display device 100 is a transmissive-type liquid crystal display device. In the exemplary embodiment, as illustrated in FIG. 2, the liquid crystal display device 100 modulates light LL incident from the counter substrate 3 and emits the light LL from the element substrate 2. Note that, a case where the light LL is incident from the counter substrate 3 side is mainly taken as an example in the following description, but the liquid crystal display device 100 may modulate the light LL incident on the element substrate 2 and emit the light LL from the counter substrate 3.

As illustrated in FIG. 1, the liquid crystal display device 100 has a rectangular shape in a plan view seen from a thickness direction of the element substrate 2, but a planar shape of the liquid crystal display device 100 is not limited to the rectangular shape and may be a round shape and the like. In addition, transmissivity refers to transmissivity for visible light in this specification. The light LL is visible light. Hereinafter, incident light incident on the liquid crystal display device 100, light passing through the liquid crystal display device 100, and emitted light emitted from the liquid crystal display device 100 may not be distinguished from one another and may be referred to as the light LL.

Element Substrate

As illustrated in FIG. 1, the element substrate 2 has such a size that contains the counter substrate 3 in the plan view. As illustrated in FIG. 2, the element substrate 2 includes a base material 21, a light-guiding layer 20, a plurality of pixel electrodes 28, and an alignment film 29. The base material 21, the light-guiding layer 20, the plurality of pixel electrodes 28, and the alignment film 29 are laminated in this order. The alignment film 29 is located to be closest to the liquid crystal layer 5 side.

Figure 3:
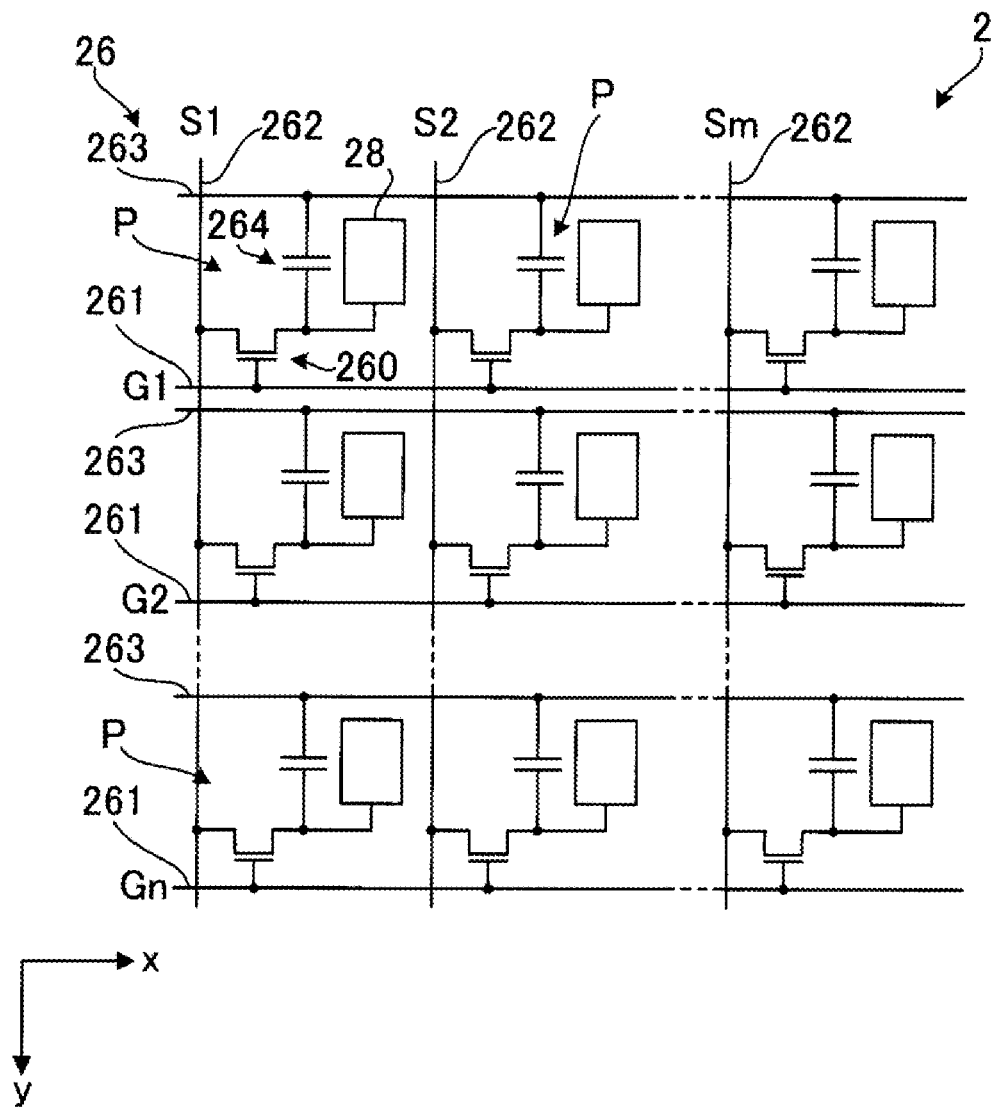
FIG. 3 is a diagram of an equivalent circuit illustrating an electrical configuration of an element substrate.
Figure 4:
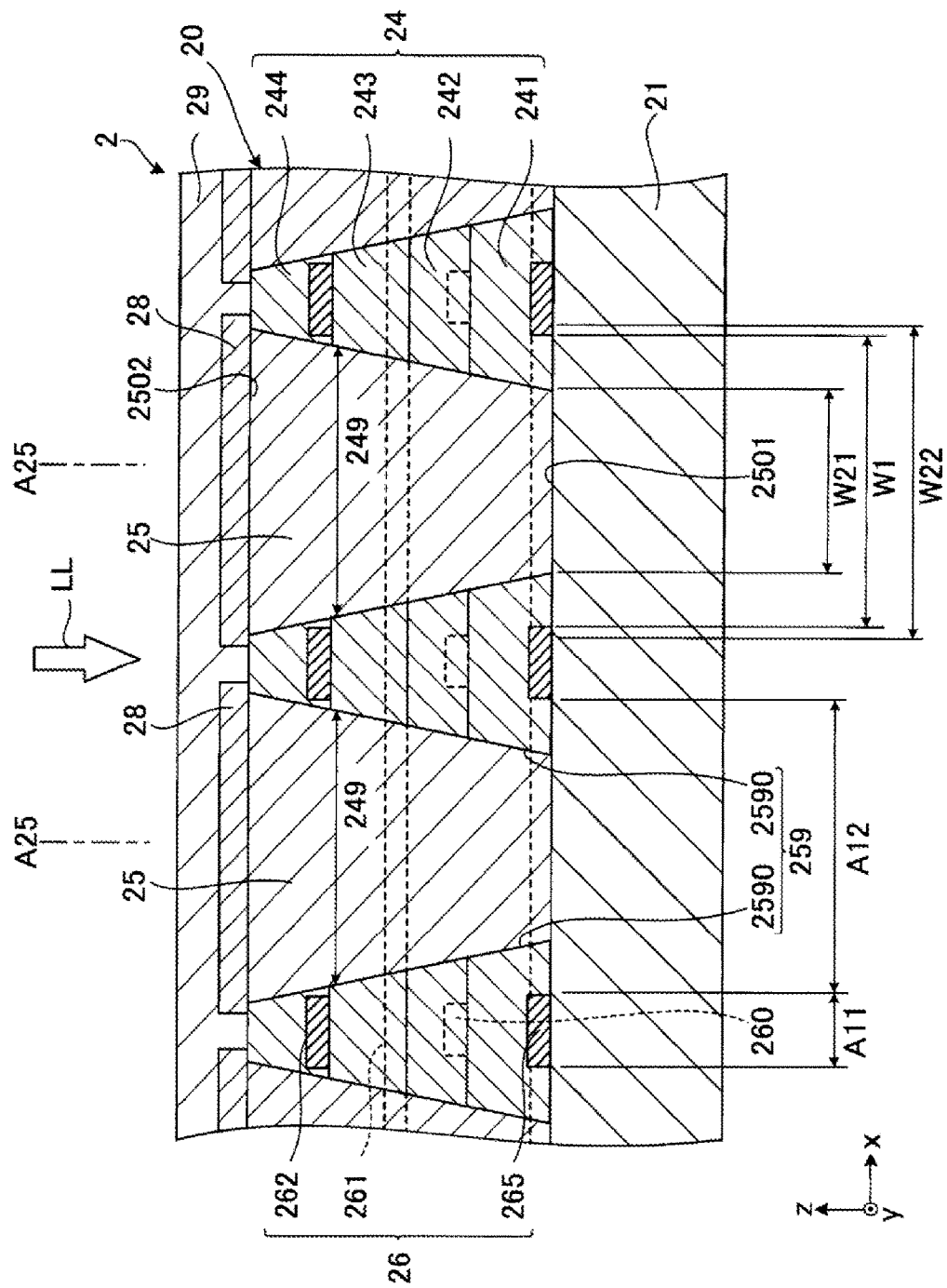
FIG. 4 illustrates an enlarged cross-sectional view of the element substrate provided in the liquid crystal display device illustrated in FIG. 1.

The base material 21 has a substantially flat plat shape and is formed of a transmissive member having insulating properties, such as glass and quartz, for example. The plurality of pixel electrodes 28 are formed of a transparent electrode material, such as indium tin oxide (ITO) and indium zinc oxide (IZO), for example. The alignment film 29 has a function of aligning liquid crystal molecules of the liquid crystal layer 5. Examples of a structural material for the alignment film 29 include polyimide and silicon oxide. Note that, as described later, the light-guiding layer 20 has a function of guiding the light LL to the base material 21 side, and includes a first insulator 24 and a plurality of second insulators 25, as illustrated in FIG. 4. As described later, the light-guiding layer 20 includes a light-shielding body 26 including a scan line 261, a data line 262, a capacitive line 263, and a light-shielding layer 265, and a TFT 260 (see FIGS. 3 and 4).

Counter Substrate

As illustrated in FIG. 2, the counter substrate 3 includes a base material 31, an insulating layer 32, a common electrode 33, and an alignment film 34. The base material 31, the insulating layer 32, the common electrode 33, and the alignment film 34 are laminated in this order. The alignment film 34 is located to be closest to the liquid crystal layer 5 side.

The base material 31 has a substantially flat plat shape and is formed of a transmissive member having insulating properties, such as glass and quartz, for example. The common electrode 33 is laminated on the base material 31 with the insulating layer 32 therebetween. The common electrode 33 is formed of a transparent electrode material, such as ITO and IZO, for example. The alignment film 34 has a function of aligning the liquid crystal molecules of the liquid crystal layer 5. Examples of a structural material for the alignment film 34 include polyimide and silicon oxide.

As illustrated in FIGS. 1 and 2, a frame-shaped peripheral partition 320 formed of a metal material having light-shielding properties and the like is provided inside the sealing member 4 of the counter substrate 3. The peripheral partition 320 is formed so as to be embedded in the insulating layer 32. The inside of the peripheral partition 320 constitutes a display region A in which an image and the like are displayed. The peripheral partition 320 prevents unnecessary stray light from being incident on the display region A, which allows a high contrast in display to be secured. The display region A includes a plurality of pixels P arranged in matrix. A conductive material 150 is provided near each of four corners of the counter substrate 3 to establish electrical communication between the element substrate 2 and the counter substrate 3.

Sealing Member

The sealing member 4 is formed of an adhesive agent and the like including various hardening resin such as epoxy resin, for example. The sealing member 4 adheres to each of the element substrate 2 and the counter substrate 3. The liquid crystal layer 5 is provided in a region surrounded by the sealing member 4, the element substrate 2, and the counter substrate 3. An inlet 41 is formed in a lower portion of the sealing material 4 in FIG. 1 to allow a liquid crystal material including liquid crystal molecules to be injected through the inlet 41. The inlet 41 is sealed with a sealing material 40 formed of various resin materials.

Liquid Crystal Layer

The liquid crystal layer 5 includes liquid crystal molecules having positive or negative dielectric anisotropy. The liquid crystal layer 5 is sandwiched between the element substrate 2 and the counter substrate 3 in such a way that the liquid crystal molecules contact both of the alignment film 29 and the alignment film 34. The liquid crystal layer 5 enables a gradation display with the light LL being modulated by changing the alignment of the liquid crystal molecules depending on a level of applied voltage.

As illustrated in FIG. 1, two scan line drive circuits 61 and one data line drive circuit 62 are provided on a surface of the element substrate 2 on the counter substrate 3 side. In the illustrated example, the two scan line drive circuits 61 are disposed on the left side and the right side of the element substrate 2 in FIG. 1. The data line drive circuit 62 is disposed on the lower side of the element substrate 2 in FIG. 1. A plurality of external terminals 64 are also provided in the outer edge portion of the surface of the element substrate 2 on the counter substrate 3 side. Wires 65 drawn from each of the scan line drive circuits 61 and the data line drive circuit 62 are connected to the external terminals 64.

The basic configuration of the liquid crystal display device 100 is described above. A drive mode of the liquid crystal display device 100 is not particularly limited, and examples of the drive mode include a twisted nematic (TN) mode and a vertical alignment (VA) mode, for example.

1(b). Electrical Configuration

Next, an electrical configuration of the liquid crystal display device 100 will be simply described. FIG. 3 is a diagram of an equivalent circuit illustrating an electrical configuration of the element substrate provided in the liquid crystal display device illustrated in FIG. 1. FIG. 3 illustrates an x-axis and a y-axis orthogonal to each other for the sake of description.

As illustrated in FIG. 3, n scan lines 261, m data lines 262, and n capacitive lines 263 are formed in the element substrate 2. Note that, n and m are integers of two or greater. The TFT 260 as a switching element is provided at each intersection of the n scan line 261 and the m data line 262. The n scan lines 261, the m data lines 262, and the n capacitive lines 263 are made of metal such as aluminum.

The n scan lines 261 are aligned at regular intervals in the y direction and extend in the x direction. The scan line 261 is electrically connected to a gate electrode of the TFT 260. The n scan lines 261 are electrically connected to the scan line drive circuits 61 (see FIG. 1). Scan signals G1, G2, . . . , and Gn are successively supplied from the scan line drive circuits 61 to the n scan lines 261.

The m data lines 262 are aligned at regular intervals in the x direction and extend in the y direction. The data line 262 is electrically connected to a source electrode of the TFT 260. The m data lines 262 are electrically connected to the data line drive circuit 62 illustrated in FIG. 1. Image signals S1, S2, . . . , and Sm are successively supplied from the data line drive circuit 62 (see FIG. 1) to the m data lines 262.

The n scan lines 261 and the m data lines 262 are insulated from each other and are formed in a grid pattern in the plan view. A region surrounded by the two adjacent scan lines 261 and the two adjacent data lines 262 corresponds to the pixel P. One pixel electrode 28 is formed in one pixel P. Note that, a drain electrode of the TFT 260 is electrically connected to the pixel electrode 28.

The n capacitive lines 263 are aligned at regular intervals in the y direction and extend in the x direction. The n capacitive lines 263 are insulated from and formed at a distance from the plurality of data lines 262 and the plurality of scan lines 261. A fixed potential such as a ground potential is applied to the capacitive line 263. A storage capacitance 264 is provided in parallel with a liquid crystal capacitance between the capacitive line 263 and the pixel electrode 28 to prevent a leak of an electric charge held in the liquid crystal capacitance.

The scan signals G1, G2, . . . , and Gn successively become active. When the n scan lines 261 are successively selected, the TFT 260 connected to the selected scan line 261 is placed into an ON state. Then, the image signals S1, S2, . . . , and Sm having magnitude according to a gradation that needs to be displayed via the m data lines 262 are taken into the pixel P corresponding to the selected scan line 261 and applied to the pixel electrode 28. In this way, a voltage according to a gradation that needs to be displayed is applied to the liquid crystal capacitance formed between the pixel electrode 28 and the common electrode 33 provided in the counter substrate 3 illustrated in FIG. 2, and thus the alignment of the liquid crystal molecules changes according to the applied voltage. The storage capacitance 264 holds the applied voltage. The light LL is modulated by the change in the alignment of the liquid crystal molecules, which enables a gradation display.

1(c). Configuration of Element Substrate

Figure 5:
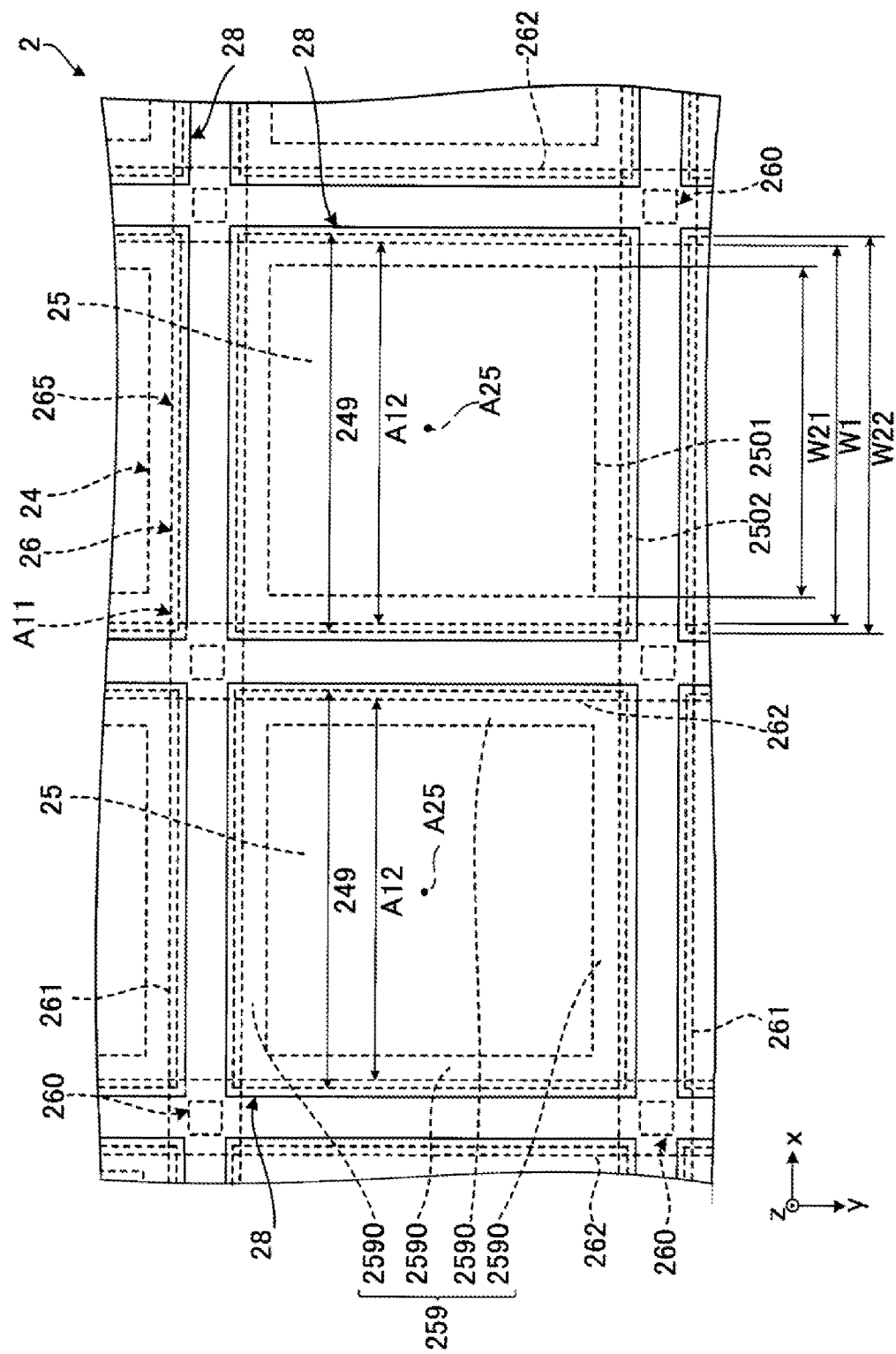
FIG. 5 is a plan view of the element substrate illustrated in FIG. 4.

Next, a detailed configuration of the element substrate 2 will be described. FIG. 4 is an enlarged cross-sectional view of the element substrate provided in an electro-optical device illustrated in FIG. 1 and an enlarged view of a region A2 in FIG. 2. FIG. 5 is a plan view of the element substrate illustrated in FIG. 4. Note that, FIG. 5 does not illustrate the alignment film 29. FIGS. 4 and 5 each illustrate the x-axis, the y-axis, and a z-axis orthogonal to one another for the sake of description. The z-axis direction is parallel to the thickness direction of the element substrate 2 and an optical axis direction of the light LL.

As described above, the element substrate 2 includes the base material 21, the light-guiding layer 20, the plurality of pixel electrodes 28, and the alignment film 29. As illustrated in FIG. 4, the light-guiding layer 20 includes the first insulator 24 and the plurality of second insulators 25. The light-guiding layer 20 further includes the TFT 260 and the light-shielding body 26.

First Insulator

As illustrated in FIG. 4, the first insulator 24 having transmissivity is provided on the base material 21. As illustrated in FIGS. 4 and 5, the first insulator 24 has a grid pattern in the plan view and has a plurality of openings 249. As illustrated in FIG. 5, the opening 249 has a rectangular shape in the plan view. As illustrated in FIG. 4, an inner wall surface forming the opening 249 has such a shape that the width continuously increases from the base material 21 side toward the pixel electrode 28 side. Note that, the opening 249 is a rectangle in the plan view, and the rectangle includes a rectangle having rounded corners. The first insulator 24 has a laminated body in which a plurality of insulating layers 241, 242, 243, and 244 are laminated. Examples of a structural material for the first insulator 24 include insulating materials having transmissivity, such as silicon oxide. Note that, the same material or different materials may be used for the respective insulating layers 241, 242, 243, and 244.

Light-Shielding Body and TFT

As illustrated in FIG. 4, the TFT 260 and the light-shielding body 26 are formed so as to be embedded in the first insulator 24. The TFT 260 and the light-shielding body 26 each overlap the first insulator 24 in the plan view. As described above, the light-shielding body 26 includes the scan line 261, the data line 262, the capacitive line 263, and the light-shielding layer 265. Note that, FIGS. 4 and 5 do not illustrate the capacitive line 263.

Herein, the light-shielding body 26 includes a light-shielding region A11 having light-shielding properties. In other words, the light-shielding body 26 is provided in the light-shielding region A11. As illustrated in FIG. 5, the light-shielding region A11 overlaps the first insulator 24 and has a grid pattern corresponding to the shape of the first insulator 24 in the plan view. Specifically, the light-shielding region A11 has a plurality of linear shapes along the x-axis direction and a plurality of linear shapes along the y-axis direction in the plan view. The second insulator 25 described later is provided in each of a plurality of opening regions A12 surrounded by the light-shielding region A11 in the plan view.

The light-shielding layer 265 is formed of a member having light-shielding properties for the light LL. As illustrated in FIG. 5, the light-shielding layer 265 has a grid pattern corresponding to the shape of the first insulator 24 in the plan view. Specifically, the light-shielding layer 265 has a plurality of linear shapes along the x-axis direction and a plurality of linear shapes along the y-axis direction in the plan view. As illustrated in FIG. 4, the light-shielding layer 265 is provided on the base material 21 and covered by the insulating layer 241. Examples of a structural material for the light-shielding layer 265 include polysilicon, metal, metal silicide, and a metallic compound. Note that, the light-shielding layer 265 does not have a function as wiring in the exemplary embodiment, but the light-shielding layer 265 may have a function as wiring.

As illustrated in FIG. 5, the plurality of scan lines 261 are aligned at regular intervals in the y direction and extend in the x direction. Note that, the scan line 261 has a width equal to a width of the light-shielding layer 265 described above in the illustrated drawing. As illustrated in FIG. 4, the scan line 261 is provided on the insulating layer 242 and covered by the insulating layer 243. Examples of a structural material for the scan line 261 include metal, metal silicide, and a metallic compound.

As illustrated in FIG. 5, the plurality of data lines 262 are aligned at regular intervals in the x direction and extend in the y direction. Note that, the data line 262 has a width equal to a width of the light-shielding layer 265 described above in the illustrated drawing. As illustrated in FIG. 4, the data line 262 is provided on the insulating layer 243 and covered by the insulating layer 244. Examples of a structural material for the data line 262 include metal, metal silicide, and a metallic compound.

As illustrated in FIG. 4, the TFTs 260 are disposed between the light-shielding layer 265 and the scan line 261. The TFTs 260 overlap the light-shielding layer 265 and the scan line 261 and are contained in them in the plan view. The TFTs 260 are provided on the insulating layer 241 and covered by the insulating layer 242. Note that, as illustrated in FIG. 5, the TFT 260 is located at a lattice point of the light-shielding layer 265 having a grid pattern in the plan view. As described above, the TFTs 260 are disposed between the light-shielding layer 265 and the scan line 261 and contained in them in the plan view, such that the light LL can be prevented or reduced from being incident on the TFTs 260.

Second Insulator

The respective second insulators 25 having transmissivity are disposed in contact with the first insulator 24 in the plurality of opening regions A12. In other words, each of the plurality of openings 249 in the first insulator 24 is filled with the second insulator 25 having transmissivity. The second insulator 25 has a refractive index greater than a refractive index of the first insulator 24. Thus, the light LL can be reflected by an interface 259 between the second insulator 25 and the first insulator 24 and then transmitted through the second insulator 25. In other words, the second insulator 25 can function as a waveguide that transmits the light LL.

As illustrated in FIG. 4, the second insulator 25 has such a shape that a width of the second insulator 25 continuously increases from the base material 21 toward the pixel electrode 28 side. In the exemplary embodiment, the second insulator 25 has a truncated square pyramid shape, and a surface 2502 of the second insulator 25 on the pixel electrode 28 side contains a surface 2501 of the second insulator 25 on the base material 21 side in the plan view (see FIGS. 4 and 5). Thus, a width W22 of the surface 2502 is greater than a width W21 of the surface 2501.

An interface 259 has a rectangular frame shape in the plan view and has four inclined surfaces 2590. Each of the inclined surfaces 2590 is a plane inclined toward a central axis A25 of the second insulator 25 along the thickness direction of the element substrate 2. Specifically, each of the inclined surfaces 2590 has an inclined portion inclined away from the central axis A25 from the base material 21 side toward the pixel electrode 28 side. The inclined surfaces 2590 have the same inclined angle. Note that, an optical axis of the light LL coincides with the central axis A25 in the exemplary embodiment, and thus it can also be considered that each of the inclined surfaces 2590 is inclined toward the optical axis. The interface 259 has a rectangular frame shape in the plan view, and the rectangle includes a rectangle having rounded corners.

As illustrated in FIG. 4, the surface 2502 is located on the pixel electrode 28 side with respect to the data line 262 described above. An outer edge of the surface 2502 overlaps the light-shielding region A11, namely, the light-shielding body 26 in the plan view (see FIGS. 4 and 5). Thus, the width W22 of the surface 2502 is greater than a width W1 of the light-shielding region A11 described above.

Examples of a structural material for the second insulator 25 include insulating materials having transmissivity, such as silicon oxynitride, silicon nitride, and aluminum oxide.

Pixel Electrode

As illustrated in FIG. 4, the plurality of pixel electrodes 28 are disposed on the second insulators 25. Specifically, as illustrated in FIG. 5, the plurality of pixel electrodes 28 are arranged in matrix in the plan view, and one pixel electrode 28 is disposed on one second insulator 25. Each of the pixel electrodes 28 overlaps and contains the second insulator 25 in the plan view. Note that, as illustrated in FIG. 4, the alignment film 29 is disposed on the plurality of pixel electrodes 28.

1(d). Optical Path in Element Substrate

Figure 6:
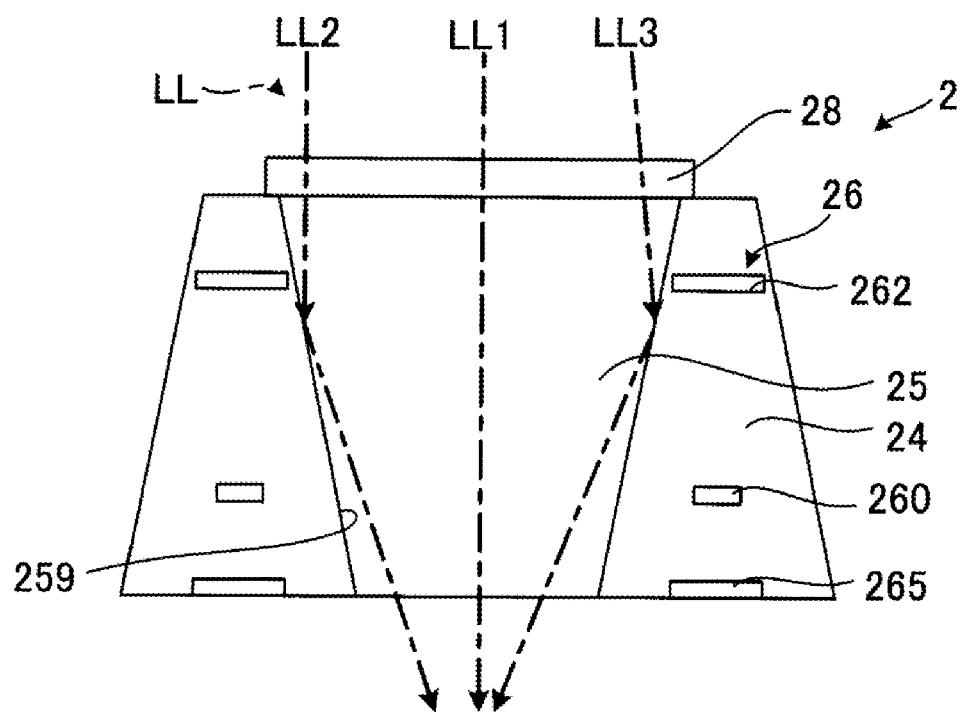
FIG. 6 is a schematic diagram illustrating light passing through the element substrate illustrated in FIG. 4.

Next, an optical path of the element substrate 2 will be described. FIG. 6 is a schematic diagram illustrating light passing through the element substrate illustrated in FIG. 4.

As illustrated in FIG. 6, after being incident on the second insulator 25, a light beam LL1 of the light LL that passes through the center of the pixel electrode 28 and is parallel to the optical axis of the light LL keeps traveling straight and is then emitted from the second insulator 25.

On the other hand, for example, when a light beam LL2 that passes through a portion close to an outer edge of the pixel electrode 28 and is parallel to the optical axis of the light LL is incident on the second insulator 25 and reaches the interface 259, the light beam LL2 is totally reflected by the interface 259 due to a relationship in refractive index between the second insulator 25 and the first insulator 24. For example, a case is considered where the first insulator 24 is made of silicon oxide, the second insulator 25 is made of silicon oxynitride, and the first insulator 24 has a refractive index of 1.46 and the second insulator 25 has a refractive index of 1.64 for visible light having a wavelength of 550 nm. In this case, an incident angle with respect to the interface 259 is greater than or equal to 62°, which results in total reflection by the interface 259 due to the Snell's law. Therefore, as illustrated, the light beam LL2 is totally reflected by the interface 259, travels toward the inside of the second insulator 25, and is then emitted from the second insulator 25. Thus, the light beam LL2 being incident on the first insulator 24 can be avoided. In other words, the light beam LL2 being deviated from the second insulator 25 can be avoided.

When a light beam LL3 that travels diagonally with respect to the optical axis of the light LL is incident on the second insulator 25, the light beam LL3 is totally reflected by the interface 259, travels toward the inside of the second insulator 25, and is then emitted from the second insulator 25 in a case where an incident angle is greater than or equal to 62°, for example. As described above, the light LL follows each of the optical paths as described above.

Herein, as described above, the liquid crystal display device 100 includes the element substrate 2 (first substrate), the counter substrate 3 (second substrate) disposed away from the element substrate 2, and the liquid crystal layer 5 that is disposed between the element substrate 2 and the counter substrate 3 and includes liquid crystal molecules (see FIG. 2). As illustrated in FIG. 4, the element substrate 2 includes the base material 21 having transmissivity, the light-shielding body 26 located on the liquid crystal layer 5 side with respect to the base material 21 and disposed in the light-shielding region A11 having a grid pattern in the plan view seen from the thickness direction of the element substrate 2, and the pixel electrode 28 located on the liquid crystal layer 5 side with respect to the base material 21 and disposed in the opening region A12 surrounded by the light-shielding region A11 in the plan view. The element substrate 2 further includes the first insulator 24 that overlaps the light-shielding body 26 in the plan view, is disposed between the base material 21 and the pixel electrode 28, and has transmissivity, and the second insulator 25 that overlaps the pixel electrode 28 in the plan view, is disposed in contact with the first insulator 24 between the base material 21 and the pixel electrode 28, and has transmissivity. The second insulator 25 has a refractive index greater than a refractive index of the first insulator 24. The outer edge of the surface 2502 of the second insulator 25 on the pixel electrode 28 side is located on the pixel electrode 28 side with respect to the light-shielding body 26 and overlaps the light-shielding body 26 in the plan view (see FIGS. 4 and 5).

According to the liquid crystal display device 100, as described above, a refractive index of the second insulator 25 is higher than a refractive index of the first insulator 24, and thus the light LL taken into the second insulator 25 can be totally reflected by the interface 259 between the second insulator 25 and the first insulator 24 and transmitted through the second insulator 25.

Accordingly, as illustrated in FIG. 6, the light LL taken into the second insulator 25 can be efficiently transmitted and emitted from the second insulator 25. Furthermore, the outer edge of the surface 2502 of the second insulator 25 overlaps the light-shielding body 26 in the plan view, and thus an aperture ratio of the light LL can be increased further than that in a known technology. For this reason, the utilization efficiency of the light LL can be increased.

As described above, the second insulator 25 has a refractive index higher than a refractive index of the first insulator 24, and thus the light LL being incident on the first insulator 24 can be reduced. Accordingly, the light LL being incident on the TFT 260 can be reduced. Thus, a malfunction of the TFT 260 can be reduced, and a leakage current can be suppressed. A waveguide can be formed in a simple configuration in which the second insulator 25 is provided in the opening 249 of the first insulator 24. For this reason, the first insulator 24 and the second insulator 25 can be easily manufactured.

Note that, the first insulator 24 and the second insulator 25 having the configurations as illustrated can be formed as follows, for example. Although the details are not illustrated, films of a plurality of layers made of silicon oxide are first formed on the base material 21 by CVD, and patterning is then performed by dry etching with etching gas in which halogen-based gas, such as fluorine, is mixed with oxygen or carbon monoxide. In this way, the first insulator 24 is formed. Subsequently, the second insulator 25 can be formed by filling, for example, a silicon oxynitride material in the opening 249 formed by patterning.

As described above, the first insulator 24 has insulating properties, and thus the scan line 261, the data line 262, and the capacitive line 263 can be suitably disposed in the first insulator 24. Herein, in a case where the first insulator 24 and the second insulator 25 are formed by using a material that does not have insulating properties, such as AlGaAs, a material for insulating the scan line 261, the data line 262, and the capacitive line 263 from one another needs to be used separately. On the other hand, the first insulator 24 and the second insulator 25 having insulating properties eliminate the need. Thus, the configuration of the light-guiding layer 20 can be simplified.

As described above, the surface 2502 of the second insulator 25 on the pixel electrode 28 side constitutes an "incident surface" allowing light to be incident on the second insulator 25 in the exemplary embodiment. In other words, as described above, the liquid crystal display device 100 in the exemplary embodiment allows light LL to be incident from the counter substrate 3 side and emitted from the element substrate 2. For this configuration, the outer edge of the surface 2502 overlaps the light-shielding body 26 in the plan view, and thus the amount of the light LL that is not incident on the second insulator 25 and is shielded by the light-shielding body 26 can be reduced. Thus, the amount of the light LL incident on the second insulator 25 can be increased further than that in known technology.

Note that, for example, when the light LL incident from the element substrate 2 side is emitted from the counter substrate 3, the light LL can be incident on a wide range of the pixel electrode 28 because the outer edge of the surface 2502 overlaps the light-shielding body 26 in the plan view. Thus, a range of the light LL that passes through the pixel electrode 28 and is emitted from the counter substrate 3 can be increased further than that in known technology. Accordingly, an aperture ratio of the light LL can be increased further than that in known technology even in the configuration in which the light LL incident from the element substrate 2 is modulated and emitted from the counter substrate 3.

As described above, the light-shielding body 26 is provided in the first insulator 24 in the plan view. In other words, as illustrated in FIG. 4, the first insulator 24 is provided between the light-shielding body 26 and the second insulator 25, and the light-shielding body 26 and the second insulator 25 are disposed away from each other. Thus, the light-shielding body 26 and the second insulator 25 can be caused not to contact each other. In a case where the light-shielding layer 265 of the light-shielding body 26 is provided so as to contact the second insulator 25, the light LL reflected by an edge of the light-shielding layer 265 may be reflected diffusely due to an irregular reflection direction and enter the first insulator 24. In contrast, the light-shielding body 26 is not exposed from the second insulator 25 by being contained in the first insulator 24 in the plan view, and thus the light LL can be prevented from being reflected diffusely by an end surface of the light-shielding layer 265. For this reason, the light LL being incident on the TFT 260 can be more efficiently avoided.

Furthermore, the interface 259 between the second insulator 25 and the first insulator 24 includes the inclined surface 2590 constituting an "inclined portion" inclined away from the central axis A25 of the second insulator 25 along the thickness direction of the element substrate 2 (first substrate) from the base material 21 side toward the pixel electrode 28 side (see FIGS. 4 and 5). With the inclined surface 2590 being provided in comparison with a case where the inclined surface 2590 is not provided, an aperture ratio of the light LL can be increased while securing a width of the light-shielding region A11 in which the light-shielding body 26 is disposed. Also, with the inclined surface 2590, the second insulator 25 having the configuration in which the second insulator 25 is disposed away from the light-shielding body 26 and the surface 2502 overlaps the light-shielding body 26 in the plan view can be easily achieved.

An inclined angle of each of the inclined surfaces 2590, namely, an angle which the central axis A25 forms with the inclined surface 2590 is not particularly limited, but is preferably greater than or equal to 3° and less than or equal to 45° and more preferably greater than or equal to 5° and less than or equal to 30°. In this way, more light LL can be taken into the second insulator 25 with a sufficient clearance between the light-shielding body 26 and the second insulator 25, and the light LL that has been taken in can be particularly efficiently transmitted.

Note that, the four inclined surfaces 2590 have the same inclined angle in the exemplary embodiment, but may have different inclined angles. Further, the interface 259 is formed of the four inclined surfaces 2590, but the interface 259 may have at least one inclined surface 2590 and the rest of the surfaces may be parallel to the central axis A25. For example, when the scan line 261 has a width smaller than a width of the data line 262, a portion of the interface 259 close to the scan line 261 may be the inclined surface 2590, and the other portion may be a surface parallel to the central axis A25. In this way, an aperture ratio can be particularly increased while securing a width of the light-shielding region A11 in which the light-shielding body 26 is disposed. Each of the inclined surfaces 2590 may have a portion parallel to the central axis A25. For example, a portion of the inclined surface 2590 on the pixel electrode 28 side may be inclined toward the central axis A25, and a portion of the inclined surface 2590 on the base material 21 side may be parallel to the central axis A25. The inclined surface 2590 may be a curved surface or have a step instead of being a plane within the bounds of not inhibiting a function of the second insulator 25 as a waveguide.

However, the interface 259 is preferably formed of the four inclined surfaces 2590 inclined toward the central axis A25 as in the exemplary embodiment. Further, it is particularly preferable that the second insulator 25 has such a shape that a width of the second insulator 25 continuously increases from the base material 21 side toward the pixel electrode 28 side. When the second insulator 25 has such a shape, an aperture ratio of the light LL can be further increased while securing a width of the light-shielding region A11 in which the light-shielding body 26 is disposed in comparison with a case where the second insulator 25 has a fixed width. Also, the second insulator 25 having the configuration in which the second insulator 25 is disposed away from the light-shielding body 26 and the surface 2502 overlaps the light-shielding body 26 in the plan view can be easily achieved. An individual difference among the plurality of second insulators 25 is easily reduced. Thus, the quality of the liquid crystal display device 100 can be improved.

As illustrated in FIG. 4, the second insulators 25 are provided across almost the entire region in the range in which the first insulator 24 is provided in the thickness direction (z-axis direction) of the element substrate 2. In this way, the second insulator 25 can more effectively function as a waveguide in comparison with a case where the second insulator 25 is not provided across almost the entire region in the range of the first insulator 24 in the z-axis direction. The possibility of the light LL being incident on the TFT 260 can also be reduced.

The liquid crystal display device 100 in the exemplary embodiment has been described above. Note that, the pixel electrode 28 contains the second insulator 25 in the plan view in the exemplary embodiment, but may not contain the second insulator 25 in the plan view, for example, as long as the pixel electrode 28 overlaps the opening region A12 in the plan view. The pixel electrode 28 and the second insulator 25 may have portions overlapping each other.

The light-shielding body 26 may further include a light-shielding layer having light-shielding properties in addition to the TFT 260, the scan line 261, the data line 262, the capacitive line 263, and the light-shielding layer 265. The order in which the TFT 260, the scan line 261, the data line 262, and the light-shielding layer 265 are laminated is not limited to the order of lamination illustrated in FIG. 4. The number of laminated layers of each of the light-shielding body 26 and the first insulator 24 is not limited to the illustrated number and may be any number.

The second insulator 25 is provided so as to fill the opening 249 of the first insulator 24 in the exemplary embodiment, but may not be provided so as to fill the opening 249 as long as the second insulator 25 contacts at least the first insulator 24.

The position of the second insulator 25 in the thickness direction of the element substrate 2 is not limited to the illustrated position. The second insulator 25 may not be disposed in the entire range of the opening 249 of the first insulator 24 in the z-axis direction. However, the second insulator 25 is preferably provided in such a way that at least the light LL does not pass through the TFT 260.

The light-shielding body 26 is provided in the first insulator 24 in the exemplary embodiment, but a part of the light-shielding body 26 may be exposed from the second insulator 25.

The second insulator 25 directly contacts the pixel electrode 28 in the exemplary embodiment, but, for example, an insulating layer having a refractive index lower than that of the second insulator 25 may be located between the second insulator 25 and the pixel electrode 28.

The second insulator 25 directly contacts the base material 21 in the exemplary embodiment, but an arbitrary layer may be located between the second insulator 25 and the base material 21 as long as the second insulator 25 is located on the liquid crystal layer 5 side with respect to the base material 21. For example, an insulating layer having a refractive index lower than a refractive index of the second insulator 25 may be located. The first insulator 24 directly contacts the base material 21 in the exemplary embodiment, but an arbitrary layer may be located between the first insulator 24 and the base material 21 as long as the first insulator 24 is located on the liquid crystal layer 5 side with respect to the base material 21. For example, an insulating layer having a refractive index equal to a refractive index of the first insulator 24 may be located.

The entire outer edge of the surface 2502 of the second insulator 25 overlaps the light-shielding body 26 in the plan view in the exemplary embodiment, but only a part of the outer edge of the surface 2502 may overlap the light-shielding body 26.

A planar shape of the opening 249 of the first insulator 24 is a rectangle in the exemplary embodiment, but the planar shape of the opening 249 may be a rectangle having curved sides and a rectangle having two opposite sides that are not parallel to each other. Similarly, a planar shape of the interface 259 is a rectangle, but the planar shape of the interface 259 may be a rectangle having curved sides and a rectangle having two opposite sides that are not parallel to each other. The first insulator 24 and the light-shielding body 26 may have portions overlapping each other. Thus, the planar shape of the opening 249 is not limited to a rectangle. For example, the planar shape of the opening 249 may be a circle, a polygon such as a hexagon, and other various odd shapes. Note that, the same applies to the planar shape of the interface 259.

Second Exemplary Embodiment

Figure 7:
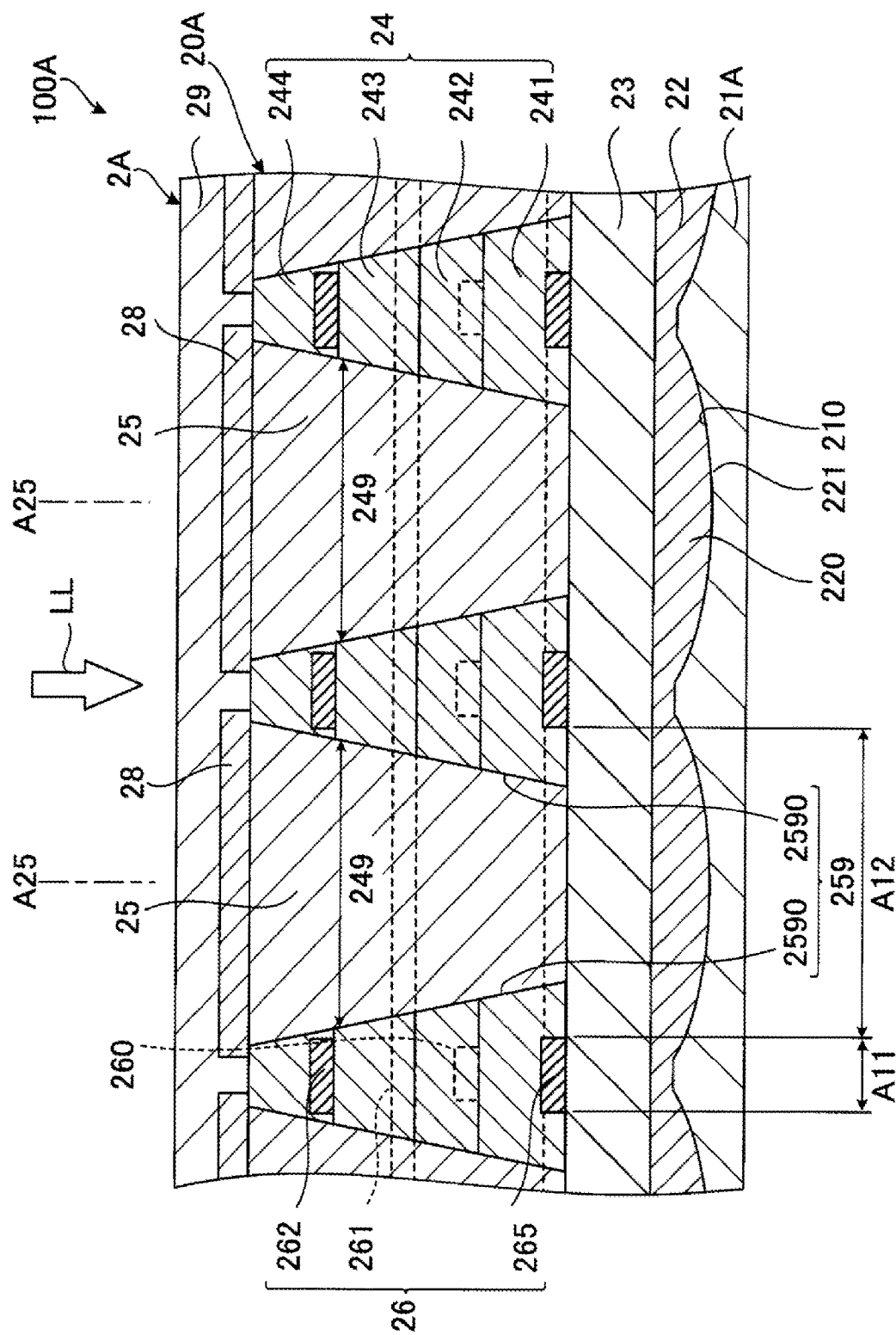
FIG. 7 illustrates an enlarged cross-sectional view of an element substrate provided in a liquid crystal display device in a second exemplary embodiment.
Figure 8:
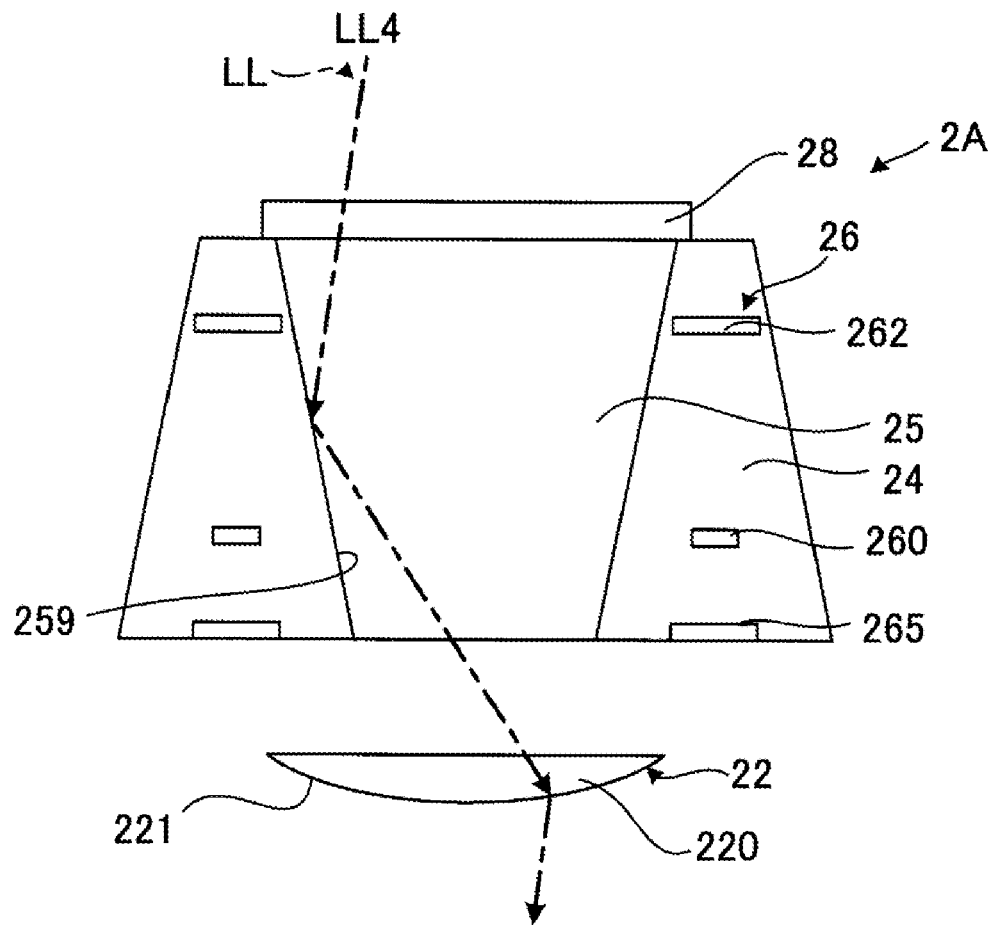
FIG. 8 is a schematic diagram illustrating light passing through the element substrate illustrated in FIG. 7.

Next, a second exemplary embodiment of the invention will be described. FIG. 7 is an enlarged cross-sectional view of an element substrate provided in a liquid crystal display device in the second exemplary embodiment. FIG. 8 is a schematic diagram illustrating light passing through the element substrate illustrated in FIG. 7.

The exemplary embodiment is identical to the first exemplary embodiment described above except mainly for that an element substrate includes a microlens array and an insulating layer.

Note that, differences between the second exemplary embodiment and the above-described first exemplary embodiment will be mainly described in the following description, and the same matters will not be described. The same configurations as those in the first exemplary embodiment described above are provided with the same reference signs in FIGS. 7 and 8.

A light-guiding layer 20A provided in an element substrate 2A of a liquid crystal display device 100A illustrated in FIG. 7 includes a microlens array 22 and an insulating layer 23.

Microlens Array

The microlens array 22 having transmissivity is provided on a base material 21A. Note that, a plurality of recessed portions 210 being arranged in matrix in the plan view and recessed in a hemispherical shape are formed in the base material 21A. The microlens array 22 includes a plurality of lens members 220 (microlenses) each having a hemispherical protruding portion corresponding to the shape of the recessed portions 210. A convex lens surface 221 of the lens member 220 contacts the surface in which the recessed portion 210 is formed. The lens member 220 is a spherical lens. The microlens array 22 has a refractive index equal to a refractive index of the second insulator 25. Examples of a structural material for the microlens array 22 include insulating materials having transmissivity, such as silicon oxynitride, silicon nitride, and aluminum oxide. Note that, the lens member 220 is a spherical lens, but may be an aspherical lens.

Insulating Layer

The insulating layer 23 having transmissivity is laminated on the microlens array 22. The insulating layer 23 has a refractive index lower than a refractive index of the microlens array 22, and has a refractive index equal to a refractive index of the first insulator 24. Examples of a structural material for the insulating layer 23 include insulating materials having transmissivity, such as silicon oxide. A surface of the insulating layer 23 opposite to the microlens array 22 is substantially flat. The first insulator 24 and the plurality of second insulators 25 are disposed on the insulating layer 23.

Herein, as described above, the element substrate 2A includes the lens member 220 that overlaps the pixel electrode 28 in the plan view, is disposed between the base material 21A and the second insulator 25, has a surface on the base material 21A side including the convex lens surface 221, and has transmissivity (see FIG. 7). With the lens member 220 being provided, a light beam LL4 that is reflected by the interface 259 of the second insulator 25 and travels diagonally across the second insulator 25 can be refracted by the convex lens surface 221, as illustrated in FIG. 8. In this way, the light beam LL4 can be emitted in parallel or substantially parallel with the optical axis of the light LL. Thus, a diagonal component of the light LL emitted from the liquid crystal display device 100A can be reduced. Accordingly, an increase in vignetting caused by a transmission angle of the light LL increased by the light LL being transmitted through the second insulator 25 can be reduced.

Note that, when the liquid crystal display device 100A has a configuration, which is not illustrated, in which the light LL is incident on the element substrate 2A, the amount of the light LL incident on the second insulator 25 can be increased by using the element substrate 2A including the lens member 220 in comparison with a case where the lens member 220 is not provided.

The liquid crystal display device 100A in the exemplary embodiment described above can also increase the utilization efficiency of the light LL, similarly to the above-described first exemplary embodiment.

Third Exemplary Embodiment

Figure 9:
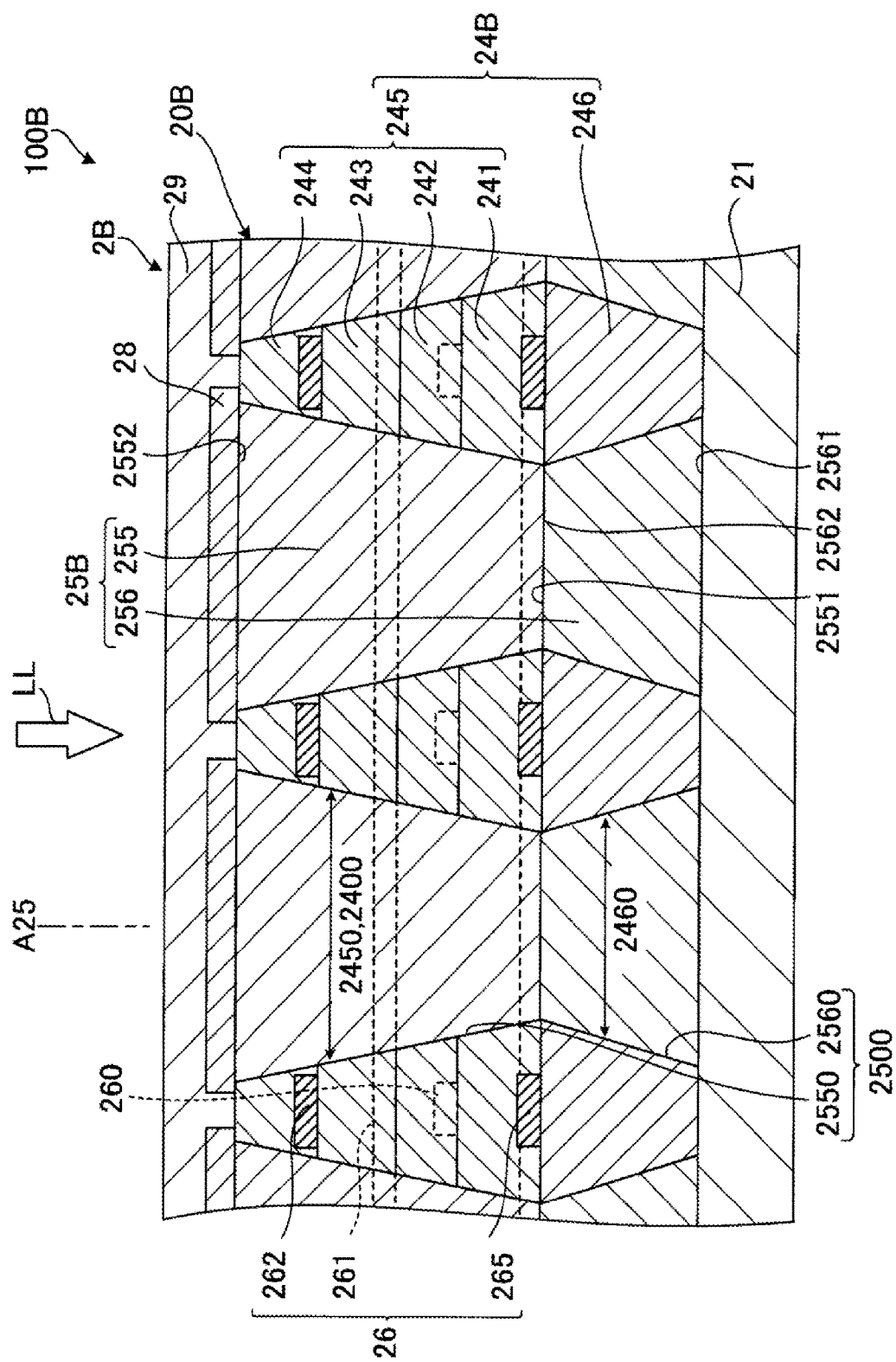
FIG. 9 illustrates an enlarged cross-sectional view of an element substrate provided in a liquid crystal display device in a third exemplary embodiment.
Figure 10:
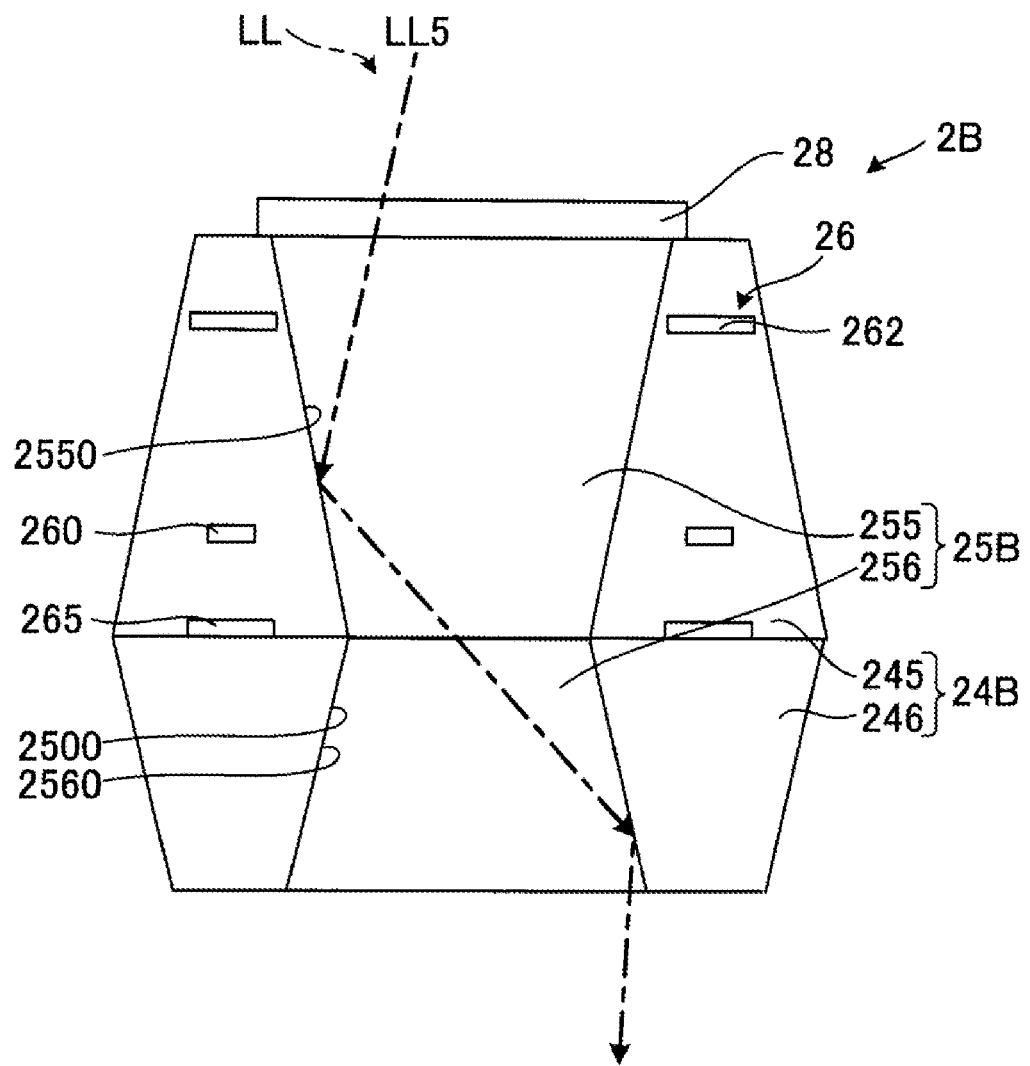
FIG. 10 is a schematic diagram illustrating light passing through the element substrate illustrated in FIG. 9.

Next, a third exemplary embodiment of the invention will be described. FIG. 9 is an enlarged cross-sectional view of an element substrate provided in a liquid crystal display device in the third exemplary embodiment. FIG. 10 is a schematic diagram illustrating light passing through the element substrate illustrated in FIG. 9.

The exemplary embodiment is mainly identical to the first exemplary embodiment described above except that configurations of a first insulator and a plurality of second insulators are different.

Note that, differences between the third exemplary embodiment and the above-described first exemplary embodiment will be mainly described in the following description, and the same matters will not be described. The same configurations as those in the first exemplary embodiment described above are provided with the same reference signs in FIGS. 9 and 10.

A light-guiding layer 20B provided in an element substrate 2B of a liquid crystal display device 100B illustrated in FIG. 9 includes a first insulator 24B and a plurality of second insulators 25B.

First Insulator

The first insulator 24B includes a base material-side portion 246 laminated on the base material 21 and a pixel-side portion 245 laminated on the base material-side portion 246. The base material-side portion 246 overlaps the pixel-side portion 245 in the plan view. Note that, the pixel-side portion 245 has the same configuration as that of the first insulator 24 in the first exemplary embodiment, and includes the insulating layers 241, 242, 243, and 244.

The base material-side portion 246 has a grid pattern in the plan view and has a plurality of openings 2460. The pixel-side portion 245 has a grid pattern in the plan view and has a plurality of openings 2450. The opening 2460 and the opening 2450 are continuously connected to each other and constitute an opening 2400. An inner wall surface forming the opening 2450 has such a shape that the width continuously increases from the base material 21 side toward the pixel electrode 28 side. On the other hand, an inner wall surface forming the opening 2460 has such a shape that the width continuously increases from the pixel electrode 28 side toward the base material 21 side.

Second Insulator

The second insulator 25B fills the opening 2400. The second insulator 25B includes a second portion 256 laminated on the base material 21 and a first portion 255 laminated on the second portion 256. The second portion 256 fills the opening 2460 of the base material-side portion 246. The first portion 255 fills the opening 2450 of the pixel-side portion 245. The first portion 255 overlaps the second portion 256 in the plan view. Note that, the first portion 255 has the same configuration as that of the second insulator 25 in the first exemplary embodiment.

The first portion 255 has such a shape that the width continuously increases from the base material 21 side toward the pixel electrode 28 side. On the other hand, the second portion 256 has such a shape that the width continuously increases from the pixel electrode 28 side toward the base material 21 side. In other words, the first portion 255 has a truncated square pyramid shape, and a surface 2552 of the first portion 255 on the pixel electrode 28 side contains a surface 2551 of the first portion 255 on the base material 21 side in the plan view. On the other hand, the second portion 256 has a truncated square pyramid shape, and a surface 2561 of the second portion 256 on the base material 21 side contains a surface 2562 of the second portion 256 on the pixel electrode 28 side in the plan view. Note that, the surface 2562 and the surface 2551 have the same shape and are integrally formed.

Further, an interface 2560 between the second portion 256 and the base material-side portion 246 and an interface 2550 between the first portion 255 and the pixel-side portion 245 are continuously connected to each other, and constitute an interface 2500. Note that, the interface 2560 and the interface 2550 each include four surfaces inclined toward the central axis A25. In the illustrated drawing, an inclined angle of each of the surfaces constituting the interface 2560 and an inclined angle of each of the surfaces constituting the interface 2550 are identical, but may be different.

Herein, as described above, the second insulator 25B includes the first portion 255 that has such a shape that a width of the second insulator 25B continuously increases from the base material 21 side toward the pixel electrode 28 side and the second portion 256 that is located on the base material 21 side with respect to the first portion 255 and has such a shape that a width of the second insulator 25B continuously increases from the pixel electrode 28 side toward the base material 21 side.

With the second portion 256 being provided, a light beam LL5 that is reflected by the interface 2550 and travels diagonally across the second insulator 25B can be reflected again by the interface 2560 of the second portion 256, as illustrated in FIG. 10. In this way, an increase in vignetting caused by a transmission angle of the light LL increased by the light LL being transmitted through the first portion 255 can be reduced. According to the element substrate 2B, the amount of the light LL incident on the second insulator 25B can be further increased with the first portion 255 being provided, and an increase in vignetting can be reduced with the second portion 256 being provided.

Note that, when the liquid crystal display device 100B has a configuration, which is not illustrated, in which the light LL is incident from the element substrate 2B, the same effects as those in the configuration in which the light LL is incident from the counter substrate 3 as in the exemplary embodiment can also be achieved.

In the illustrated drawing, the size of the surface 2561 of the second portion 256 in the plan view is smaller than the size of the surface 2552 of the first portion 255 in the plan view, but the surface 2551 and the surface 2562 may have the same size. In the illustrated drawing, an outer edge of the surface 2552 of the first portion 255 overlaps the light-shielding body 26 in the plan view while an outer edge of the surface 2561 of the second portion 256 does not overlap the light-shielding body 26 in the plan view. However, the outer edge of the surface 2561 may overlap the light-shielding body 26 in the plan view, similarly to the outer edge of the surface 2552. With each of the outer edges of the surface 2552 and the surface 2561 overlapping the light-shielding body 26 in the plan view, an increase in vignetting can be particularly effectively reduced, and the utilization efficiency of the light LL can also be particularly increased.

The liquid crystal display device 100B in the exemplary embodiment described above can also increase the utilization efficiency of the light LL, similarly to the above-described first exemplary embodiment.

2. Projection-Type Display Apparatus

Figure 11:
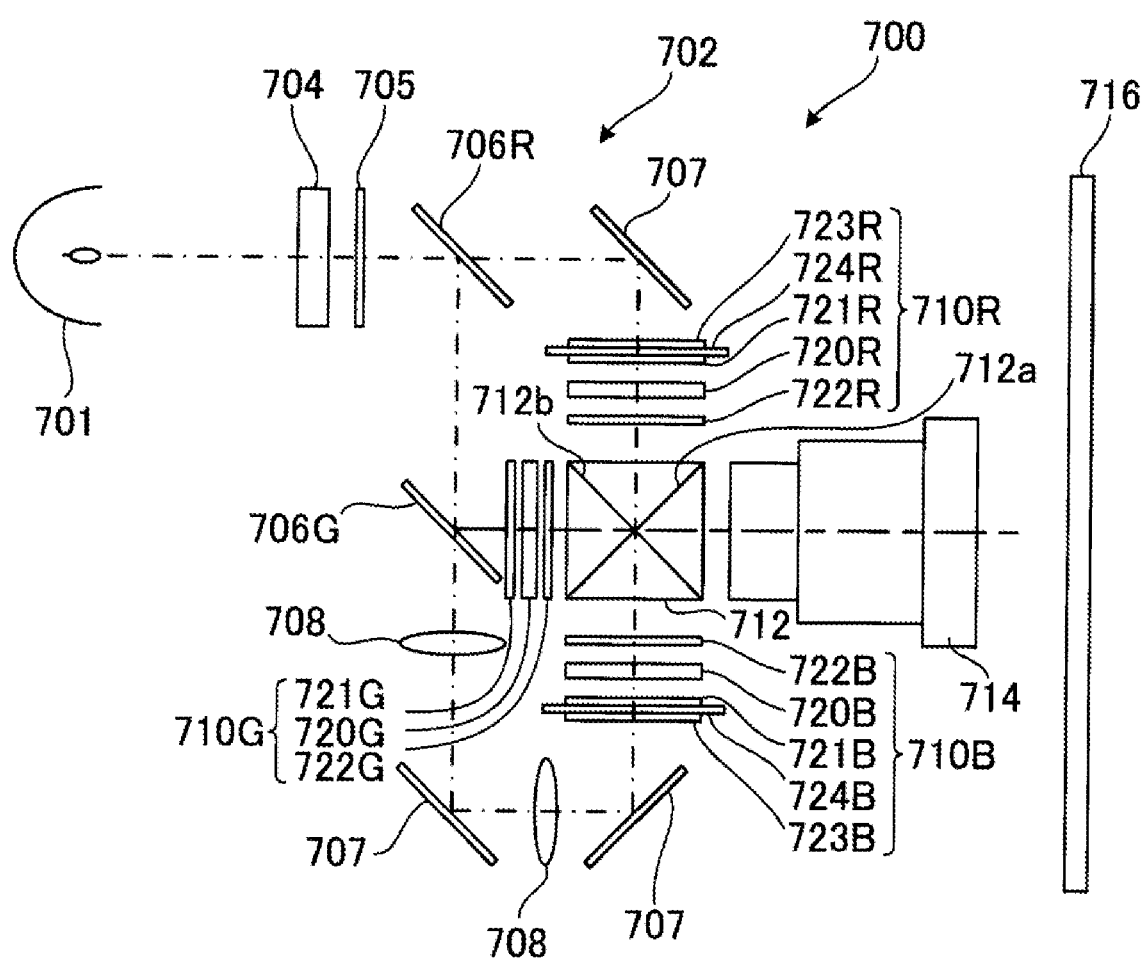
FIG. 11 is a schematic diagram illustrating one example of a projection-type display apparatus.

Next, a projection-type display apparatus as one example of an electronic apparatus in the invention will be described. FIG. 11 is a schematic diagram illustrating one example of a projection-type display apparatus including a liquid crystal display device.

As illustrated in FIG. 11, a projector 700 as a projection-type display apparatus includes a light source device 701, an integrator 704, a polarized light converting element 705, a color separation light-guiding optical system 702, a liquid crystal light modulation device 710R, a liquid crystal light modulation device 710G, and a liquid crystal light modulation device 710B as light modulation devices, a cross dichroic prism 712, and a projection optical system 714. As described later in detail, the liquid crystal light modulation devices 710R, 710G, and 710B respectively include liquid crystal display devices 720R, 720G, and 720B. For example, the liquid crystal display devices 100, 100A, and 100B described above can be used as the liquid crystal display devices 720R, 720G, and 720B.

The light source device 701 supplies light LL including red light (hereinafter referred to as "R light") as first color light, green light (hereinafter referred to as "G light") as second color light, and blue light (hereinafter referred to as "B light") as third color light. For example, an extra-high pressure mercury lamp can be used as the light source device 701.

The integrator 704 equalizes an illumination distribution of the light LL emitted from the light source device 701. The polarized light converting element 705 converts the light LL having the equalized illumination distribution into polarized light having a specific vibration direction, such as s-polarized light that has been s-polarized with respect to a reflection surface provided in the color separation light-guiding optical system 702, for example. The s-polarized light converted from the light is incident on an R-light transmission dichroic mirror 706R constituting the color separation light-guiding optical system 702.

The color separation light-guiding optical system 702 includes the R-light transmission dichroic mirror 706R, a B-light transmission dichroic mirror 706G, three reflection mirrors 707, and two relay lenses 708.

The R-light transmission dichroic mirror 706R separates R light from other light to allow passage of the R light and reflect G light and B light. The R light passing through the R-light transmission dichroic mirror 706R is incident on the reflection mirror 707. The reflection mirror 707 bends an optical path of the R light at 90 degrees. The R light having the bent optical path is incident on the liquid crystal modulation device 710R.

The liquid crystal light modulation device 710R is a transmissive-type liquid crystal device configured to modulate the R light according to an image signal. The liquid crystal light modulation device 710R includes a A/2 phase difference plate 723R, a glass plate 724R, a first polarizing plate 721R, the liquid crystal display device 720R, and a second polarizing plate 722R. The A/2 phase difference plate 723R and the first polarizing plate 721R are disposed in contact with the transmissive glass plate 724R that does not convert a polarization direction.

An optical path of each of the G light and the B light is bent at 90 degrees by reflecting the G light and the B light with the R light transmission dichroic mirror 706R. The G light and the B light having the bent optical paths are each incident on the B-light transmission dichroic mirror 706G. The B-light transmission dichroic mirror 706G separates the B light from other light to allow passage of the B light and reflect the G light. The G light reflected by the B-light transmission dichroic mirror 706G is incident on the liquid crystal light modulation device 710G. The liquid crystal light modulation device 710G is a transmissive-type liquid crystal device configured to modulate the G light according to an image signal. The liquid crystal light modulation device 710G includes the liquid crystal display device 720G, a first polarizing plate 721G, and a second polarizing plate 722G.

The G light incident on the liquid crystal light modulation device 710G is converted into s-polarized light. The s-polarized light incident on the liquid crystal light modulation device 710G passes through the first polarizing plate 721G without change and is incident on the liquid crystal display device 720G. The G light of the s-polarized light incident on the liquid crystal display device 720G is converted into p-polarized light by modulation according to an image signal. The p-polarized light converted from the G light by modulation in the liquid crystal display device 720G is emitted from the second polarizing plate 722G. In this way, the G light modulated in the liquid crystal light modulation device 710G is incident on the cross dichroic prism 712.

The B light passing through the B-light transmission dichroic mirror 706G is incident on the liquid crystal light modulation device 710B through the two relay lenses 708 and the two reflection mirrors 707.

The liquid crystal light modulation device 710B is a transmissive-type liquid crystal device configured to modulate the B light according to an image signal. The liquid crystal light modulation device 710B includes a A/2 phase difference plate 723B, a glass plate 724B, a first polarizing plate 721B, the liquid crystal display device 720B, and a second polarizing plate 722B. The B light incident on the liquid crystal light modulation device 710B is converted into s-polarized light. The s-polarized light incident on the liquid crystal light modulation device 710B is converted into p-polarized light by the A/2 phase difference plate 723B. The p-polarized light converted from the B light passes through the glass plate 724B and the first polarizing plate 721B without change, and is incident on the liquid crystal display device 720B. The B light of the p-polarized light incident on the liquid crystal display device 720B is converted into s-polarized light by modulation according to an image signal. The s-polarized light converted from the B light by modulation in the liquid crystal display device 720B is emitted from the second polarizing plate 722B. The B light modulated in the liquid crystal light modulation device 710B is incident on the cross dichroic prism 712.

The cross dichroic prism 712 as a color synthesis optical system includes two dichroic films 712a and 712b disposed orthogonal to each other in an X shape. The dichroic film 712a reflects the B light and allows passage of the G light. The dichroic film 712b reflects the R light and allows passage of the G light. The cross dichroic prism 712 synthesizes the R light, the G light, and the B light modulated in the liquid crystal light modulation devices 710R, 710G, and 710B, respectively.

The projection optical system 714 projects the light synthesized in the cross dichroic prism 712 onto a screen 716. In this way, a full color image can be obtained on the screen 716.

The projector 700 includes the liquid crystal display device 100, 100A, or 100B described above. As described above, the liquid crystal display devices 100, 100A, and 100B each have a higher aperture ratio and higher utilization efficiency of light than those in a known liquid crystal display device. Thus, brightness of the projector 700 can be improved, and the projector 700 of excellent quality can be provided.

Note that, the liquid crystal display devices 100, 100A, and 100B described above can be each used as a front projection projector configured to project a projection image from an observing side and a rear projection projector configured to project a projection image from a side opposite to the observing side.

Note that, electronic apparatuses including the liquid crystal display device 100, 100A, and 100B are not limited to projectors. For example, the liquid crystal display devices 100, 100A, and 100B may be each used as a projection type Head Up Display (HUD), a direct-view type Head Mounted Display (HMD), or a display unit of an information terminal apparatus, such as an electronic book, a personal computer, a digital still camera, a liquid crystal television, a viewfinder type or monitor direct-view type video recorder, a car navigation system, an electronic organizer, and a POS.

The transmissive-type liquid crystal display device and the electronic apparatus in the invention have been described above based on the illustrated exemplary embodiments, but the invention is not limited to these. The configuration of each unit in the invention may be replaced with any configuration that achieves the same functions as those in the above-described exemplary embodiments, and may also be added with any configuration. In addition, any configurations in each of the exemplary embodiments described above may be combined together in the invention.

The entire disclosure of Japanese Patent Application No. 2018-024085, filed Feb. 14, 2018 is expressly incorporated by reference herein.

What is claimed is:

1. A transmissive-type liquid crystal display device comprising:
   a base material having transmissivity;
   a light-shielding body having a grid pattern in a plan view seen from a thickness direction of the base material;
   a pixel electrode;
   a first insulator that is provided to cover the light-shielding body and has transmissivity; and
   a second insulator that is disposed in contact with the first insulator between the base material and the pixel electrode and has transmissivity, wherein
   a refractive index of the second insulator is higher than a refractive index of the first insulator, and
   an outer edge of a surface of the second insulator on the pixel electrode side overlaps the light-shielding body in the plan view,
   wherein
   the second insulator includes a first portion that has such a shape that a width of the second insulator continuously increases from the base material side toward the pixel electrode side and a second portion that is located on the base material side with respect to the first portion and has such a shape that a width of the second insulator continuously increases from the pixel electrode side toward the base material side.

2. The transmissive-type liquid crystal display device according to claim 1, wherein
   the surface of the second insulator on the pixel electrode side is an incident surface allowing light to be incident on the second insulator.

3. The transmissive-type liquid crystal display device according to claim 1, wherein
   the light-shielding body and the second insulator are disposed away from each other.

4. The transmissive-type liquid crystal display device according to claim 1, wherein
   an interface between the second insulator and the first insulator includes an inclined portion inclined away from a central axis of the second insulator along the thickness direction of the base material from the base material side toward the pixel electrode side.

5. The transmissive-type liquid crystal display device according to claim 4, wherein
   the second insulator has such a shape that a width of the second insulator continuously increases from the base material side toward the pixel electrode side.

6. The transmissive-type liquid crystal display device according to claim 1, comprising:
   a lens member that overlaps the pixel electrode in the plan view, is disposed between the base material and the second insulator, has a surface on the base material side including a convex lens surface, and has transmissivity.

7. An electronic apparatus comprising:
   the transmissive-type liquid crystal display device according to claim 1.

* * * * *